US007703126B2

(12) United States Patent
Khosravi et al.

(10) Patent No.: US 7,703,126 B2
(45) Date of Patent: Apr. 20, 2010

(54) HIERARCHICAL TRUST BASED POSTURE REPORTING AND POLICY ENFORCEMENT

(75) Inventors: Hormuzd Khosravi, Portland, OR (US); David Durham, Beaverton, OR (US); Karanvir Grewal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1055 days.

(21) Appl. No.: 11/395,504

(22) Filed: Mar. 31, 2006

(65) Prior Publication Data

US 2007/0234402 A1    Oct. 4, 2007

(51) Int. Cl.
G06F 17/30    (2006.01)
(52) U.S. Cl. ..................... 726/2; 726/3; 726/4
(58) Field of Classification Search ............ 726/2, 726/3, 4
See application file for complete search history.

(56) References Cited

U.S. PATENT DOCUMENTS

| | | | |
|---|---|---|---|
| 5,968,176 A | 10/1999 | Nessett et al. | |
| 6,535,988 B1 * | 3/2003 | Poisner | 713/500 |
| 7,013,484 B1 * | 3/2006 | Ellison et al. | 726/26 |
| 7,124,327 B2 * | 10/2006 | Bennett et al. | 714/38 |
| 2004/0193912 A1 | 9/2004 | Li et al. | |

OTHER PUBLICATIONS

Discovery of policy anomalies in distributed firewalls; Al-Shaer, E.S.; Hamed, H.H.; INFOCOM 2004. Twenty-third Annual Joint Conference of the IEEE Computer and Communications Societies vol. 4, Mar. 7-11, 2004 pp. 2605-2616 vol. 4.*
Trie-based policy representations for network firewalls; Fulp, E.W.; Tarsa, S.J.; Computers and Communications, 2005. ISCC 2005. Proceedings. 10th IEEE Symposium on Jun. 27-30, 2005 pp. 434-441.*
Dynamic Balancing of Packet Filtering Workloads on Distributed Firewalls; Guanhua Yan; Songqing Chen; Eidenbenz, S.; Quality of Service, 2008. IWQoS 2008. 16th International Workshop on Jun. 2-4, 2008 pp. 209-218.*
International Preliminary Report for Int'l Patent Application No. PCT/US2007/064699 mailed Sep. 30, 2008, 8 pgs.

* cited by examiner

*Primary Examiner*—David Y Jung
(74) *Attorney, Agent, or Firm*—Blakely, Sokoloff, Taylor & Zafman LLP

(57) ABSTRACT

A method that includes initiating a network access request from an access requester on a platform that couples to a network, the network access request made to a policy decision point for the network. The method also includes establishing a secure communication channel over a communication link between the policy decision point and a policy enforcement point on the platform. Another secure communication channel is established over another communication link. The other communication link is between at least the policy enforcement point and a manageability engine resident on the platform. The manageability engine forwards posture information associated with the access requester via the other secure communication channel. The posture information is then forwarded to the policy decision point via the secure communication channel between the policy enforcement point and the policy decision point. The policy decision point indicates what access the access requester can obtain to the network based on a comparison of the posture information to one or more network administrative policies.

36 Claims, 6 Drawing Sheets

HIERARCHICAL TRUST BASED POSTURE REPORTING AND POLICY ENFORCEMENT

BACKGROUND

With the recent rise in virus and worm attacks, industry efforts have emerged to harden computing devices coupled to a network against these attacks and also to install measures for protecting the network from attack-prone computing devices. This has resulted in a number of industry initiatives to define proprietary and standards based network security frameworks and communication protocols. When employed, these standards based network security frameworks may contain or counteract virus or worm attacks. Additionally, the Institute for Electrical and Electronic Engineers (IEEE) and the Internet Engineering Task Force (IETF) standards bodies have defined or are in the process of defining communication protocols which may be leveraged to provide additional network security. These industry initiatives seek to provide strict access control for computing devices to connect to a network.

Countermeasures defined to protect against network attacks have primarily taken the form of Open Systems Interconnection (OSI) layer 2, IEEE 802.1X communication protocols. See IEEE 802.1X-2001, published Oct. 25, 2001 ("IEEE 802.1X"), and/or later versions. These communication protocols typically leverage IETF defined Extensible Authentication Protocol (EAP) and associated derivatives to determine a computing device's credentials, before the device or any element residing/operating on the device is allowed access to the network. See IETF, Network Working Group, Request for Comments: 3748, Extensible Authentication Protocol, published June 2004 ("RFC 3748"), and/or later versions.

Once initial authentication has been performed (e.g., via IEEE 802.1X and/or RFC 3748) and a computing device has been granted access to the network, an additional protocol may be executed which maintains a secure communication channel over which all subsequent data is carried. This secure communication channel offers cryptographic services such as data origin authenticity and data confidentiality. As a result, the most predominant security threats are likely prevented or contained. For wireless network access, this secure communication channel may operate in compliance with IEEE 802.11i-2004, published July 2004 ("IEEE 802.11i"), and/or later versions. For wired network access, the secure communication channel may operate in compliance with two related specifications to EEE 802.1X. The first is IEEE 802.1AE, Draft 5.1, published January 2006 ("IEEE 802.1AE"), and/or later drafts or revisions. The second is an amendment to IEEE 802.1X, and is IEEE 802.1AF, Draft 0.4, published January 2006, ("IEEE 802.1AF"), and/or later drafts or revisions. Additionally, OSI Layer 3 and Layer 4 industry initiatives for secure communication channels also exist. These OSI Layer 3 and Layer 4 initiatives include one for Internet Protocol Security (IPsec)—IETF, Network Working Group, RFC 2401, Security Architecture for the Internet Protocol, published November 1998 ("RFC 2401"), and another one for Transport Layer Security (TLS)—IETF, Network Working Group, RFC 2246, The TLS Protocol Version 1.0, published January 1999 ("RFC 2246").

Regardless of the efforts taken to harden computing devices against virus and worm attacks to protect a given network, research has shown that within a typical corporate wired network, the majority of security breaches stem from inside the network. These breaches may be intentional or as a side affect of negligence on the part of the user of a computing device. For example, in today's environment, many users have mobile computing devices (e.g., notebook computers), which are used within the corporation, as well as from the home. Within the corporation, some degree of control may be enforced for accessing network resources. However, when the typical user connects a computing device to the Internet from an external source (home, hotel, Internet cafe), he/she may inadvertently download a virus/worm when visiting an insecure site on the Internet. This virus/worm can be transferred to the corporate network at the computing device's next connection to the network. Even within the corporation, policies may not always be enforced—e.g. a user not always updating the latest anti-virus data file from the corporate site. Thus exposing the network to possible attacks by new viruses or worms.

Traditional technologies allow validation of the identity and state of a computing device (e.g., via integrity or posture measurements) after an access request to the network is initiated. The IEEE 802.1X model provides a framework for carrying additional protocols such as EAP, which provide capabilities for exchanging a computing device's authenticated identity and posture information prior to allowing at least some access to the network. This aids in controlling any malicious device/software from entering onto the network, without prior evaluation. This is achieved by providing a security solution at the lowest common denominator of the network stack and performing authentication before a computing device is allowed to acquire an IP address. However, unauthorized or rogue agents may still gain access by mimicking an authorized computing device or spoofing the authentication process.

DETAILED DESCRIPTION

Figure 1:
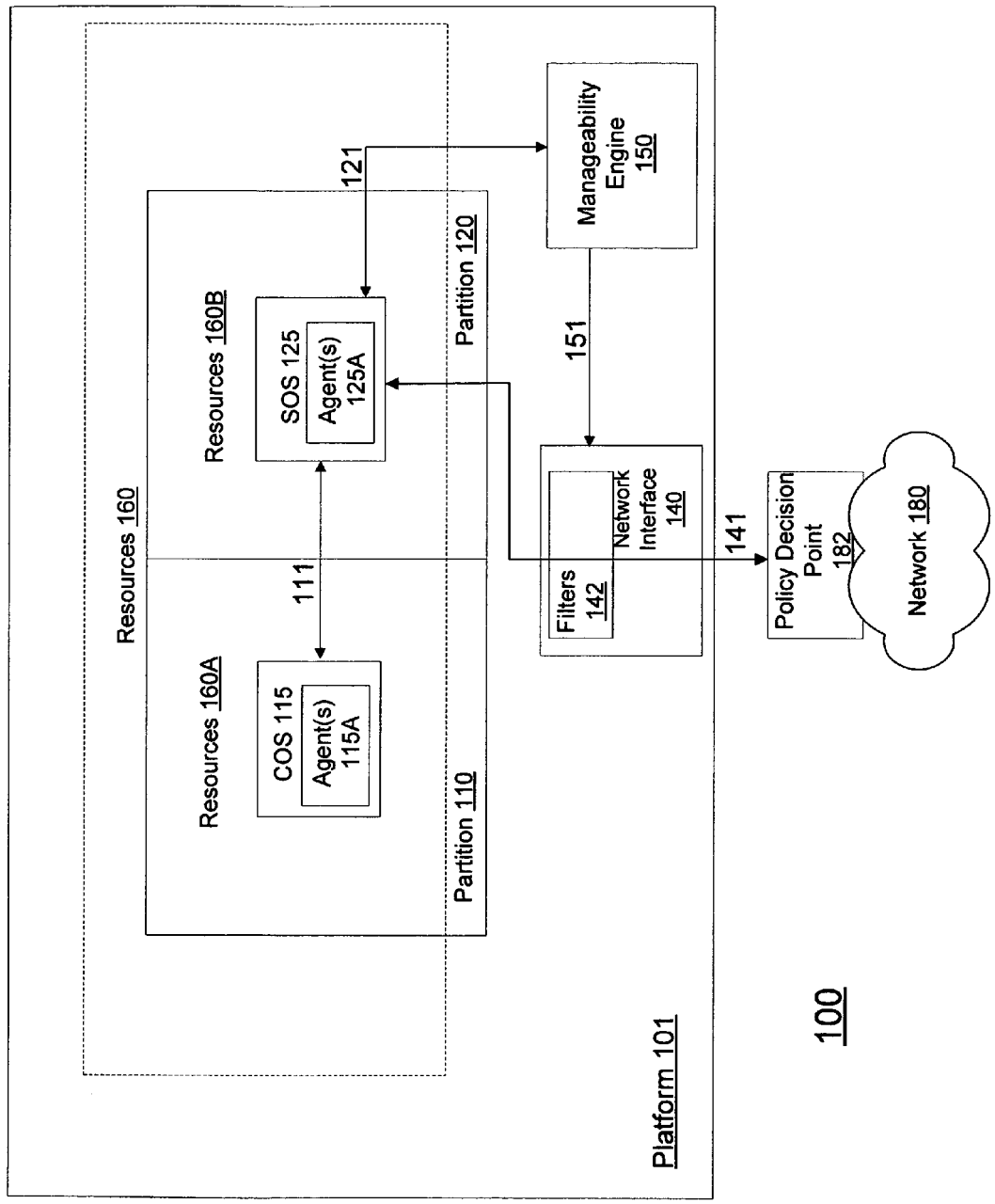
FIG. 1 is an illustration of elements of an example system.

As mentioned above, industry efforts have emerged to harden computing devices against virus and worm attacks and install measures for containing the spread of these attacks from rogue agents against networks. As described in more detail below, a high amount of trust is needed for computing devices that couple to the network to protect a network from these rogue agents that may attack a network. For example, trust based on information such as the computing device and/or its elements being who or what they claim to be and also information that may detect when rogue agents have compromised that trust. The level of trust based on this information may be used to determine what access the computing device and/or its elements may obtain to the network and or what remediation actions are needed if access is denied.

In one implementation, a computer network (or, simply, a network) is two or more interconnected computing devices that provide voice or data processing. The term "network boundary" may refer to a logical boundary between a network and the computing devices that are outside of the network. Various network access schemes exist to control access to a network boundary. One example of a network access scheme to control network access involves three network entities: an access requester, a policy enforcement point, and a policy decision point.

In this example network access scheme, an access requester is an entity that seeks access to a network (e.g., to a protected network). The access requester usually resides within a platform for a computing device. Almost any computing device, platform or element (e.g., hardware, software, firmware or a combination of these elements) within a platform may be an access requester. A characteristic of an access requester, for example, is a capability to initiate a request to access a network.

A policy enforcement point, in this example network access scheme, is an entity that enforces the access decisions of the policy decision point. The policy enforcement point may also engage in an authentication/authorization process with the access requester and forward the results of the authentication/authorization process to the policy decision point. A policy enforcement point is implemented, for example, at a switch, at a firewall, as part of a Virtual Private Network (VPN) gateway and/or on the platform of a computing device via hardware, software or some combination of both hardware and software.

The policy decision point, in this example network access scheme, is a network entity that decides whether to grant network access rights to an access requester based, for example, on a network administrative policy. These network administrative policies may include one or more access control policies to determine who or what may access the network. The network administrative policies may also include one or more outbreak containment policies, intrusion detection policies, and/or monitoring policies, and the like. In one example, the policy decision point is implemented in a server coupled between the network and the policy enforcement point. In an alternate example, the policy enforcement point and the policy decision point are implemented as two logical components/elements which are physically co-located (e.g., on a platform of a computing device, in a network switch, a network server, etc.).

In one example, a network access request is initiated from an access requester on a platform that couples to a network. The network access request is made to a policy decision point for the network. A secure communication channel is established over a communication link between the policy decision point and a policy enforcement point on the platform. A secure communication channel is also established over another communication link, the other communication link between at least the policy enforcement point and a manageability engine resident on the platform. In this example, the manageability engine forwards posture information associated with the access requester and the manageability engine. The posture information is forwarded via the secure communication channel between the manageability engine and the policy enforcement point. The posture information is then forwarded to the is policy decision point via the secure communication channel between the policy enforcement point and the policy decision point. The policy decision point is to indicate what access the access requester can obtain to the network based on a comparison of the posture information to one or more network administrative policies.

FIG. 1 is an illustration of elements of an example system 100. In one example, system 100 includes the three network entities described above to implement a network access scheme. These three network entities are described in more detail below as elements on platform 101 and/or part a network coupled to platform 101.

As depicted in FIG. 1, system 100 includes platform 101 to couple to network 180 through policy decision point 182 via communication link 141. In one example, communication link 141 includes wired and/or wireless pathways via which platform 101 couples to network 180.

In one implementation, as mentioned above, platform 101 is part of a computing device. This computing device may be a desktop computer, a laptop computer, a notebook computer, a server, a digital broadband telephony device, a digital home network device (e.g., cable/satellite/set top box, etc.), a personal digital assistant (PDA) and the like. In one example, network 180 includes, but is not limited to, a wired or a wireless local area network (LAN/WLAN), a wide area network (WAN/WWAN), a metropolitan area network (MAN), a personal area network (PAN) and a cellular or a wireless broadband telephony network.

In one example, platform 101 includes the software, hardware, and/or firmware to support one more functions for a computing device. These tasks may include client/host activities, storage, general processing tasks, etc. At least a portion of this software, hardware, and/or firmware is depicted in FIG. 1 as resources 160. In one implementation, resources 160A and 160B represent memory and processing elements that are dedicated to or used independently by partitions 110 and 120, respectively. Although platform 101 is shown with only two partitions, this disclosure is not limited to two partitions but any number of partitions on a platform in a computing device is possible. As will be described for FIG. 2, these partitions may be part of a virtualization technology enabled platform.

In one implementation, partition 110 includes a capability operating system (COS) 115. COS 115, in one example, represents those elements that respond to a user's request to process data or carry out a user initiated function for a computing device. COS 115 is depicted as including agent(s) 115A. Agent(s) 115A, for example, include one or more agents to facilitate initiation of an access request to network 180 and to maintain a secure communication channel between a policy enforcement point and/or a policy decision point once access is granted.

In this implementation, partition 120 includes service operating system (SOS) 125. SOS 125, in one example, provides a secure execution environment (not shown) for network access control (NAC) communication protocols (e.g., IEEE 802.1X and/or RFC 3748). Additionally, SOS 125 may provide a secure execution environment to implement authentication procedures to protect platform 101 elements coupled to platform 101 and to potentially establish one or more hierarchical trust layers to access a network. These authentication procedures include, but are not limited to, extensible markup language (XML) signatures and public key infrastructure (PKI) certifications. These two examples of authentication procedures are at least partially described in IETF, Network Working Group, RFC 4210, Internet X.509 Public Key Infrastructure Certificate Management Protocol, published September 2005 ("RFC 4210") and IETF, Network Working Group, RFC 3275, XML-Signature Syntax and Processing, published March 2002 ("RFC 3275").

In FIG. 1, SOS 125 is depicted as including agent(s) 125A. Agent(s) 125A, for example, perform functions to facilitate network access for elements on platform 101 that request access to a network. In one example, agent(s) 125A include a policy enforcement agent to act as a policy enforcement point on behalf of a network administrator for network 180. In one example, agent(s) 125A may also act as an intermediary between platform 101 elements (e.g., COS 115) and an untrusted network. This may facilitate a safe access from a roaming location to protect these elements from potentially harmful or malicious entities. As described more below (see FIG. 6), this may also enable platform 101 to establish at least one hierarchical trust layer to access at least one network.

In one example, platform 101 includes network interface 140. Network interface 140 may include the software, hardware and/or firmware to couple platform 101 to a network via wired or wireless pathways (e.g., a media access controller, wireless transceiver, digital signal processor, antennae, radio, fabric interface, etc.). Network interface 140, as depicted in FIG. 1, may also include filters 142. Filters 142, in one example, are data traffic filters that are used to control the flow of data traffic to and from platform 101 via communication link 141. As described in more detail below, filters 142 may be configured by elements on platform 101 to facilitate the enforcement of network administrative policies and to possibly establish one or more hierarchical trust layers to access a network. In other examples, other data traffic filters are allocated to one or more platform 101 partitions and controlled by other elements on platform 101 (e.g., SOS 125, agent(s) 125A, manageability engine 150, etc.).

In one implementation, platform 101 includes manageability engine 150. As portrayed in FIG. 1, manageability engine 150 is coupled to SOS 125 via communication link 121 and to network interface 140 via communication link 151. In one example, as described in more detail below, manageability engine 150 includes logic and memory to establish a secure communication channel (e.g., using XML signatures and/or PKI certifications) with a policy enforcement agent from among agent(s) 125A. This secure communication channel, for example, is established via communication link 121. In this example, manageability engine 150 obtains posture information associated with both itself and with an access requester on platform 101 (e.g., COS 115) and/or other elements resident on or associated with platform 101. The obtained posture information is then forwarded to the policy enforcement agent via the secure communication channel on communication link 121. In one example, this posture information, as described below, is subsequently forwarded to policy decision point 182.

In a broad sense, posture information includes integrity measurements that refer to empirical data collected from the hardware, software, and/or firmware of a platform associated with or allocated to support or implement an access requester (e.g., COS 115). The integrity measurements may also be associated with a manageability engine (e.g., manageability engine 150). For example, integrity measurements are obtained directly by manageability engine 150 or with the assistance of elements on platform 101 (e.g., agent(s) 115A or 125A). Manageability engine 150, for example, has direct access to hardware services or resources resident on platform 101 (not shown). These hardware resources may include processing elements, chipset registers, memory, busses, firmware, etc. Manageability engine 150, for example, can directly or indirectly access these hardware resources to obtain integrity measurements to gather posture information for platform 101.

In one example, integrity measurements include anti-virus parameters, firewall status, software versions, hardware status, log/trace files, the existence of given software in memory on the platform and the like. In one implementation, gathered posture information is used to determine the presence and/or capabilities of certain agents associated with an access requester and/or a manageability engine. For example, anti-virus software is an agent included among agent(s) 115A in COS 115. The integrity measurements for anti-virus parameters, for example, determine the status (e.g., most current version), capabilities and the integrity/authenticity of this agent.

In one implementation, the posture information obtained and forwarded by manageability engine 150 is also forwarded to policy decision point 182 over a secure communication channel that is established via communication link 141. Policy decision point 182, for example, indicates what network access to network 180 that the access requester can obtain based on a comparison of the posture information to network administrative policies.

In one example, SOS 125 uses agent(s) 125A to gather posture information about COS 115 and convey this posture information either directly or indirectly to policy decision point 182. For example, SOS 125 establishes a secure communication channel and also implements authentication procedures with policy decision point 182 (e.g., cryptographically signing exchanged information). Thus, establishing SOS 125 as a trusted agent that can directly convey the posture information gathered on COS 115 for policy decision point 182 to determine whether to grant COS 115 access to network 180, to maintain a previously granted access or to maintain a given hierarchical trust layer that was obtained when access was granted. In an indirect example, SOS 125 utilizes manageability engine 150 to be the trusted agent to policy decision point 182. Thus, the posture information is first forwarded to manageability engine 150 and then is subsequently forwarded to policy decision point 182.

As mentioned briefly above, in one example, agent(s) 125A included in SOS 125 may act as intermediaries between platform 101 elements and an untrusted network. In this example, the platform 101 element is COS 115. Thus, for example, if platform 101 is in a mobile computing device (e.g., a notebook computer) agent(s) 125A may allow for a user to gain safe access from a roaming location using COS 115 without the fear of being harmed or hijacked by malicious entities (e.g., worms, viruses, etc.).

Figure 2:
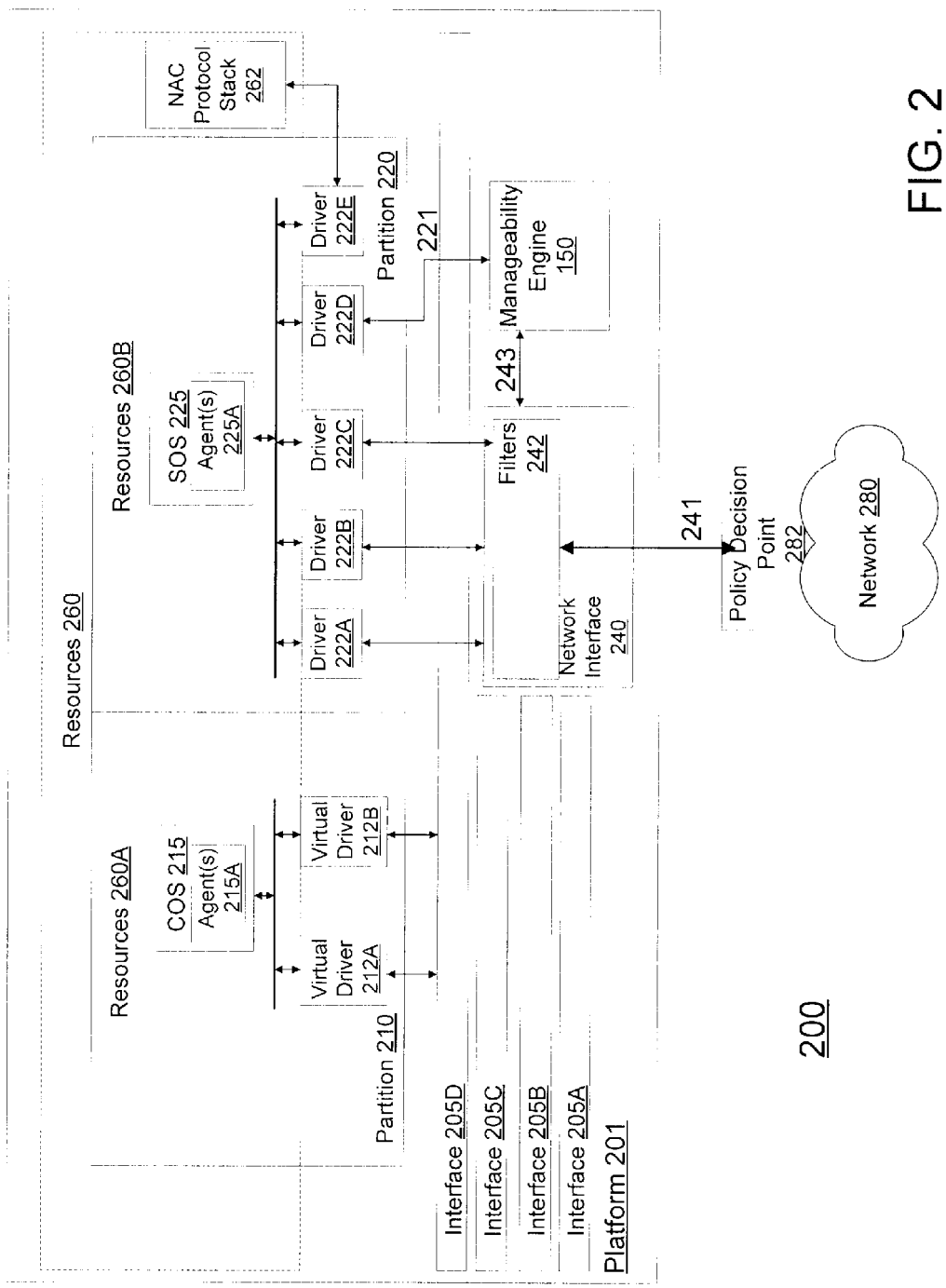
FIG. 2 is an illustration of an example system including a virtualization technology enabled platform.

FIG. 2 is an illustration of an example system 200 including a virtualization technology enabled platform 201 to couple to network 280. As depicted in FIG. 2, system 200 contains similar elements to system 100 portrayed in FIG. 1. In one implementation, platform 201 is part of a computing device (not shown) that couples to either a LAN or a WLAN (e.g., network 280) via communication link 241.

In one example, platform 201 is designed to operate according to a virtualization technology scheme. This scheme, for example, partitions the resources to support a plurality of operating systems. At least a portion of these resources is shown in FIG. 2 as resources 260. In one example, resources 260A and 260B represent those resources that are dedicated to or independently used by partitions 210 and 220. The virtualization scheme, for example, partitions these resources in such a way that an operating system can operate separately and independently to other operating systems. Although FIG. 2 depicts only two partitions on platform 201, platform 201 may contain any number of partitions to support a plurality of operation systems.

In one implementation, as depicted in FIG. 2, platform 201 includes interfaces 205A-D to assist in implementing the virtualization scheme. For example, interface 205A is an interface that initializes processing elements and memory resources for virtualization operations (e.g., central processing unit, memory controller, memory, etc.). Interface 205B, for example, initializes or prepares basic input/output systems (BIOS) for virtualization operations. Interface 205C may be an interface to initialize firmware on platform 201 (e.g., an extensible firmware interface (EFI) or a universal extensible firmware interface (UEFI). Interface 205D may be an interface that can be used for isolation and recovery (e.g., client isolation and recovery technology (CIRT)) should platform 201 need to be remotely managed without involving operating systems on platform 201. Interface 205D may also enable one or more operating systems (e.g., COS 215) to use virtual drivers, as discussed below.

In one example, partition 210 includes COS 215. Similar to COS 115 described above, COS 215, in one example, is a capability operating system. In this example, COS 215 represents those elements that respond to a user's request to process data or carry out a user initiated function for a computing device (not shown). COS 215, in one example, includes agent(s) 215A. These agents, for example, perform certain functions to facilitate an access request for COS 215 to network 280. In one example, agent(s) 215A gather posture information about COS 215 and other elements that are controlled by COS 215. Agent(s) 215A, for example, also facilitate secure communications from COS 215. This may include the initiation of an access request to network 280 and carrying out any processes to authenticate itself to network 280 or to policy enforcement/decision points for access to network 280.

In one implementation, partition 210 couples to virtual drivers 212A-B. In this implementation, these drivers are deemed as "virtual" because they may appear to COS 215 as the actual drivers but are actually memory slots partitioned to COS 215. As a result, other elements (e.g., SOS 225) on or coupled to platform 201 may couple to the actual drivers and thus may forward commands placed into the partitioned memory slots to these actual drivers. The virtual drivers may be accessed, for example, via interface 205D. Virtual driver 212A, for example, is used by COS 215 to access or communicate with a wireless network interface (e.g., a WLAN network interface card (NIC)). Virtual driver 212B, for example, is used by COS 215 to access a wired network interface (e.g., a LAN NIC). For example, these wired and/or wireless NICs are included in network interface 240.

In one example, partition 220 includes SOS 225. SOS 225, as shown in FIG. 2, includes agent(s) 225A. Agent(s) 225A, in one example, include a policy enforcement agent that enables SOS 225 to act as a policy enforcement point on behalf of a network administrator for network 280.

In one implementation, agent(s) 225A access or control drivers 222A-E that are coupled to partition 220. Driver 222A, for example, is to allow agent(s) 225A to access a wired network interface in network interface 240 and driver 222B allows access to a wireless interface in network interface 240 (both not shown). Driver 222D, for example, is accessed by agent(s) 225A to communicate with manageability engine 150.

In one example, driver 222C is a driver for a policy enforcement agent from among agent(s) 225 to enforce network administrative policies. The policy enforcement agent may enforce the network administrative polices through use of one or more circuit breaker filters (not shown). These circuit breaker filters may be located within filters 242 in network interface 240 and/or located within partitions on platform 201. In that sense, the circuit breaker filters may be based in hardware, firmware, software or a combination of hardware, software or firmware that is resident on platform 201. These circuit breaker filters, for example, will filter the flow of data traffic to or from platform 201. Thus, the policy enforcement agent may use driver 222C to configure these circuit breaker filters such that data traffic is blocked (e.g., circuit broken) if certain criterion associated with the network administrative polices are not met. This criterion, for example, is based on posture information obtained by manageability engine 150, the indication of what network access is granted by a policy decision point for a network, or a method of accessing or coupling to the network, e.g., through another network.

In one implementation, SOS 225 maintains or has access to any number of NAC communication protocols to establish or maintain a secure communication channel. These NAC communication protocols, for example, are portrayed in FIG. 2 as NAC protocol stack 262. In one example, NAC protocol stack 262 may be maintained or stored in a memory (not shown) included in resources 260 that is accessible to SOS 225. These NAC communication protocols include various security related protocols described, for example, in industry standards or initiatives. These industry standards or initiatives include, but are not limited to, IEEE 802.1AE/af for IEEE 802.1X protocols, RFC 3748 for EAP protocols, RFC 2401 for IPsec protocols, RFC 2246 for TLS protocols and IEEE 802.11i for wireless LAN protocols. In one example, driver 222E may be a bridge driver via which agent(s) 225A access NAC protocol stack 262 to establish a secure communication channel.

In one example, a policy enforcement agent included in agent(s) 225A establishes a secure communication channel with policy decision point 282 via communication link 241. Thus, in this example, the policy enforcement agent accesses NAC protocol stack 262 via driver 222E to establish this secure communication channel. In one implementation, this secure communication channel is also used to forward posture information associated with an access requester (e.g., COS 215).

As depicted in FIG. 2, platform 201 includes manageability engine 150 coupled to SOS 225 via communication link 221. In one example, as described above, manageability engine 150 includes logic and memory to establish a secure communication channel (e.g., using XML signatures and/or PKI certifications) via communication link 221. This secure communication channel may be established with a policy enforcement agent from among agent(s) 225A. In this example, manageability engine 150 obtains posture information associated with both itself and with an access requester (e.g., COS 215) on platform 201 and/or other elements resident on or associated with platform 201. The obtained posture information is then forwarded to the policy enforcement agent on the secure communication channel via communication link 221.

In one implementation, the posture information obtained and forwarded by manageability engine 150 and/or agent(s) 225 is also forwarded to policy decision point 282 over a secure communication channel that is established via communication link 241. In one example, policy decision point 282 indicates what network access to network 280 that the access requester can obtain based on a comparison of the posture information to network administrative policies. As described above for FIG. 1, this process of posture gathering, reporting and interpretation may be carried out by various features in manageability engine 150 and/or a policy enforcement agent from among agent(s) 225A.

In one implementation, as shown in FIG. 2, communication link 243 couples manageability engine 150 to network interface 240. Communication link 243, for example, is an exclusive communication link accessible only to manageability engine 150 to enforce default network administrative polices for platform 201. For example, as part of the start-up or power-up of platform 201, manageability engine 150 uses communication link 243 to configure filters 242 in network interface 240. Filters 242 may be configured such that only control data traffic can flow from elements on platform 201 via communication link 241. This control data traffic, for example, includes the data traffic between SOS 225 and a policy decision point for a network. This control data traffic may establish a secure communication channel to obtain access to that network. As a result, in this implementation, all data traffic flowing from platform 201 that does not relate to establishing a secure communication channel is blocked until the secure communication channel is established. This blocking, for example, establishes a first hierarchical trust layer to access network 280.

In one implementation, rather than or in addition to implementing default network administrative policies, manageability engine 150 gathers posture information and routes that information through SOS 225 and over communication link 241 to a policy decision point for a network. This information may be encrypted or signed with a PKI private key for manageability engine 150. Based at least in part on the PKI private key signature, the policy decision point trusts that manageability engine 150 is the sender of the posture information. The policy decision point may then forward information signed with a PKI key for the policy decision point back to manageability engine 150 over communication link 241 and through SOS 225. This information, when decrypted, may indicate what access is initially granted in order for SOS 225 to establish a secure communication channel and obtain greater access to the network. In one example, enforcement of policies by SOS 225 to ensure platform 201 elements don't exceed the access granted, establishes a second hierarchical trust layer to access network 280.

In one example, as part of start-up procedures, manageability engine 150 gathers posture information associated with SOS 225 before an image of SOS 225 is activated on platform 201 (e.g., partitioned resources are allocated). Manageability engine 150 may compare this posture information to default network administrative polices to ensure that SOS 225 has the proper credentials to serve as a service operating system for platform 201. This may prevent a rogue agent from corrupting SOS 225 and acting as a trusted agent to platform 201. These default network administrative polices may include authentication and integrity requirements for SOS 225. For example, a PKI authentication scheme is used to authenticate SOS 225 to manageability engine 150. An integrity scheme may be used that includes, but is not limited to, a challenge-response exchange between manageability engine 150 and SOS 225. This authentication/integrity scheme, for example, establishes at least a first hierarchical trust layer to access network 280.

Manageability engine 150, in one example, based on SOS 225 not meeting the default network administrative policies, initiates remediation procedures. For example, manageability engine 150 establishes a secure communication channel with policy decision point 282 on network 280 (e.g., via communication links 243 and 241). Since this secure communication channel has no data traffic from entities on platform 201 other than manageability engine 150, the secure communication channel, in one example, is an out-of-band network connection. In this example, manageability engine 150 requests information on obtaining a new image for SOS 225 or downloading a patch from a server coupled to network 280 via this out-of-band network connection. In one example, manageability engine 150 includes (e.g., stored in a memory on or accessible to manageability engine 150), a NAC protocol stack to facilitate establishing and maintaining this out-of-band network connection until SOS 225 is updated or patched.

In another example, based on SOS 225 not meeting the default network administrative policies or SOS 225's image is improperly activated, manageability engine 150 limits or restricts the access that an access requester on platform 201 may obtain to network 280. In this example, since COS 215 does not utilize SOS 225 to request and gain access to network 280, access is restricted or limited by manageability engine 150 (e.g., via filters 242). This restriction may stay in effect until remediation procedures are taken to properly activate SOS 225 and/or bring it into compliance with the default network administrative policies.

Figure 3:
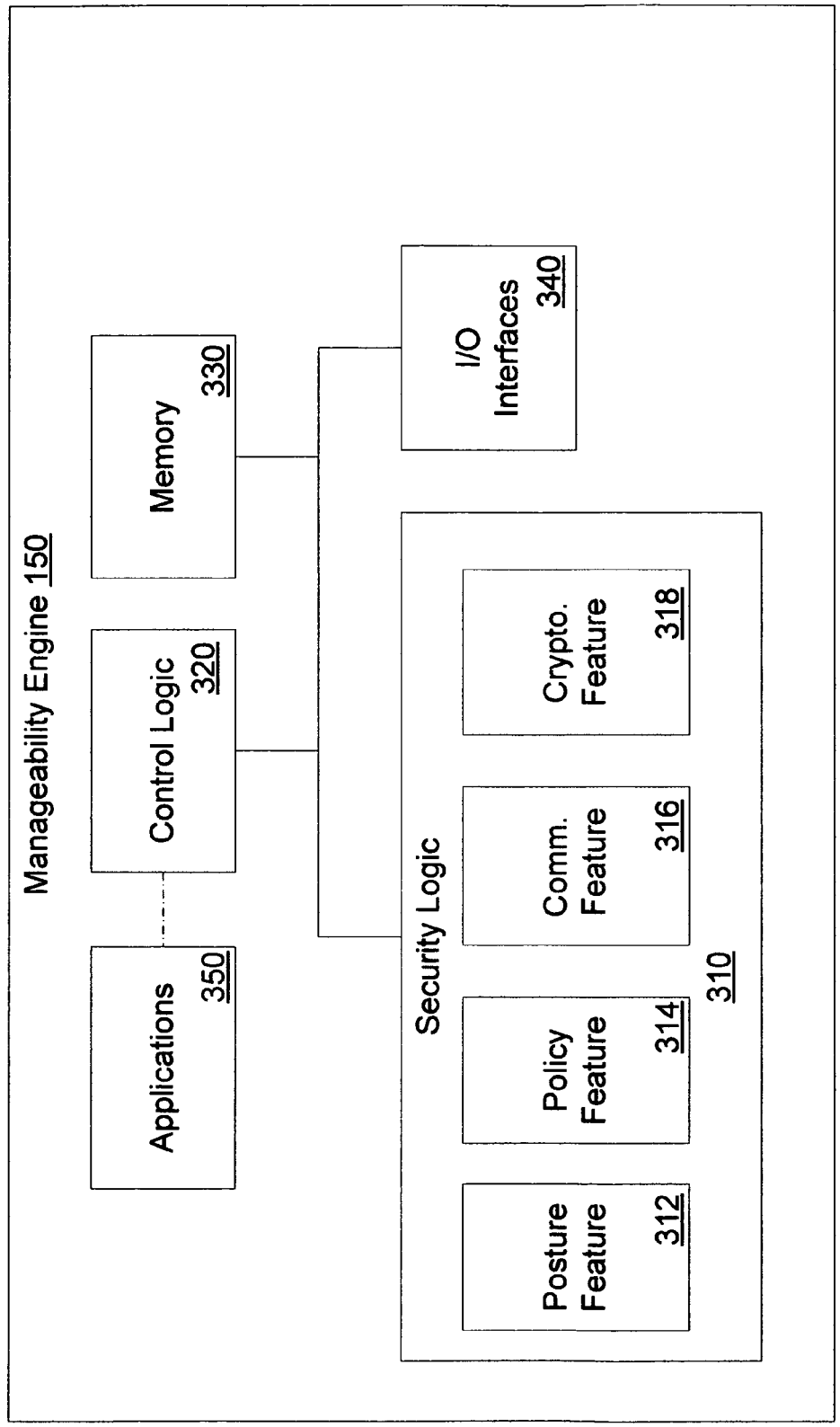
FIG. 3 is a block diagram of an example architecture for a manageability engine.

FIG. 3 is a block diagram of an example architecture for manageability engine 150. In FIG. 3, manageability engine 150 includes security logic 310, control logic 320, memory 330, input/output (I/O) interfaces 340 and optionally one or more applications 350, each coupled as depicted.

In one example, the elements portrayed in FIG. 3's block diagram are those elements to support or enable a manageability engine 150 as described in this disclosure. For example, security logic 310 and control logic 320 each or collectively represent any of a wide variety of logic device(s) or executable content to implement the features of manageability engine 150. These logic device(s) may include a microprocessor, network processor, service processor, microcontroller, field programmable gate array (FPGA), application specific integrated circuit (ASIC), sequestered thread or core of a multi-core/multi-threaded microprocessor, special operating mode of a processor (e.g., system management mode) or combination thereof.

In FIG. 3, security logic 310 includes posture feature 312, policy feature 314, communicate feature 316 and cryptographic feature 318. In one implementation, security logic 310 uses these features to perform several functions. These functions include, for example, obtaining posture information, enforcing default network administrative polices, establishing a secure communication channel with a policy enforcement agent, cryptographically signing the posture information and forwarding that information to the policy enforcement agent. These functions may also include verifying the integrity and authenticity of an indication by a policy decision point (e.g., policy decision point 282) of what network access (e.g., to network 280) the access requester can obtain based on the forwarded posture information. In another implementation, these features may be used to take remediation actions should default or other network administrative polices fail to grant the access desired or needed by the access requester.

Control logic 320 may control the overall operation of manageability engine 150 and as mentioned above, may represent any of a wide variety of logic device(s) or executable content to implement the control of manageability engine 150. In alternate examples, the features and functionality of control logic 320 are implemented within security logic 310.

According to one example, at least a portion of memory 330 is memory that is exclusively accessible to security logic 310 or control logic 320 to temporarily store information. For example, a secret key to be used to cryptographically sign posture information or information related to a secure connection between manageability engine 150 and a policy enforcement agent (e.g., from among agent(s) 225A), information to generate XML signatures, or information regarding default network administrative polices. A NAC communication protocol stack may also be stored in at least a portion of memory 330 to assist in establishing and maintaining a secure communication channel via an out-of-band communication link. Memory 330 may also store executable content. The executable content may be used by control logic 320 and/or security logic 310 to implement or activate features or elements of manageability engine 150.

I/O interfaces 340 may provide an interface via a communication medium or link between manageability engine 150 and elements resident on a platform (e.g., platform 201) or located remotely to the node (e.g., a policy decision point such as policy decision point 282). As a result, I/O interfaces 340 may enable security logic 310 or control logic 320 to receive a series of instructions from these elements. The series of instructions may enable security logic 310 and/or control logic 320 to implement one or more features of manageability engine 150. This may include enforcing default network administrative policies.

In one example, manageability engine 150 includes one or more applications 350 to provide internal instructions to control logic 320 and/or security logic 310.

Figure 4:
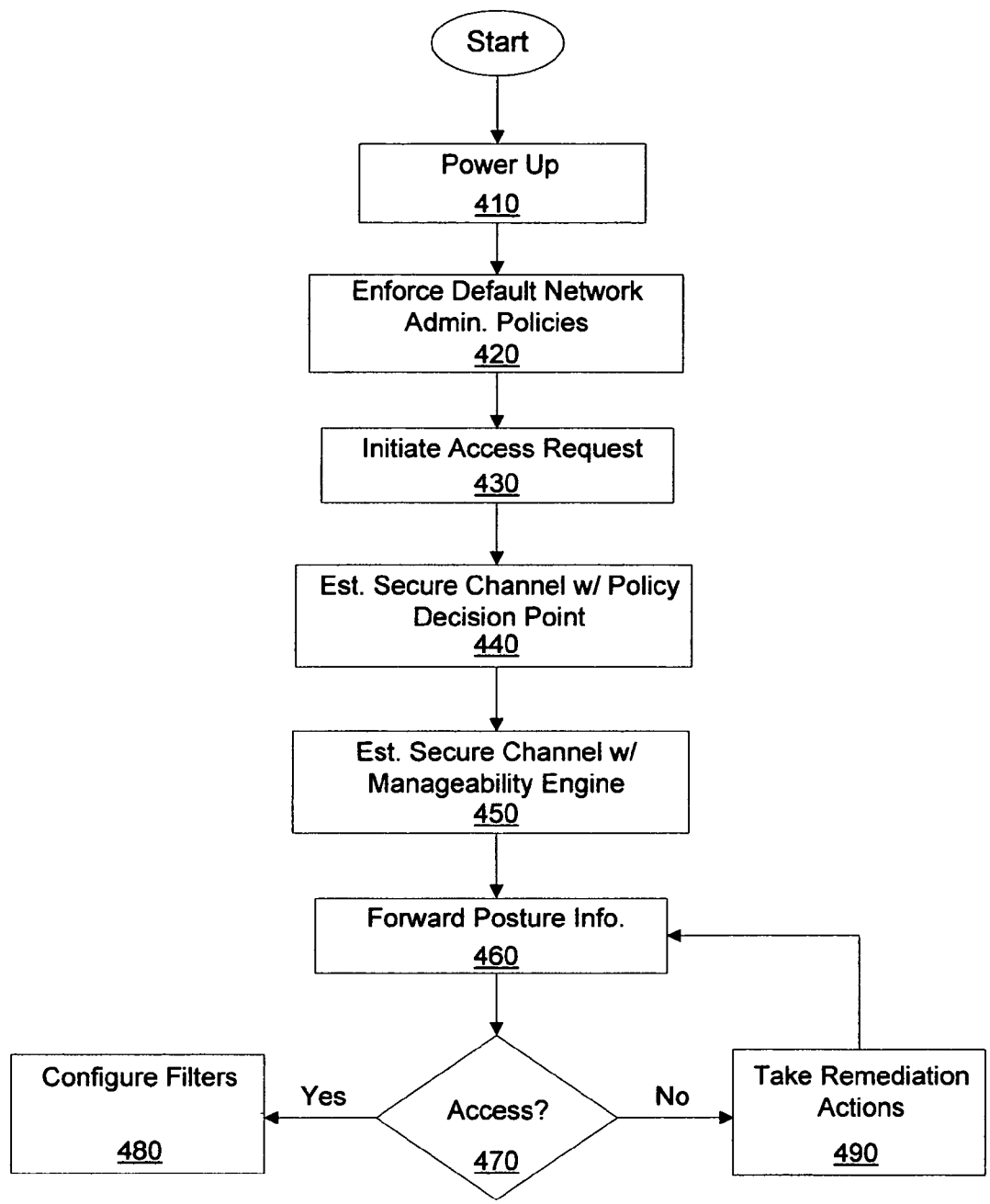
FIG. 4 is a flow chart of an example method to obtain network access.

FIG. 4 is a flow chart of an example method to obtain network access. In one example, system 200 depicted in FIG. 2 is used to describe this method. In block 410, for example, a platform such as platform 201 is powered-on or powered-up. This power-up may occur as power is initially provided to platform 201, or incident to a reset of the platform.

In block 420, in one example, upon power-up of platform 201, security logic 310 in manageability engine 150 activates policy feature 314. Policy feature 314, in one example, obtains default network administrative policies (e.g., from memory 330). In this example, based on those default network administrative policies, policy feature 314 configures filters 242 in network interface 240. As mentioned above, this may allow only control data traffic to flow from elements on platform 201 and may also establish a first hierarchical trust layer to access network 280.

In one implementation, security logic 310 also activates posture feature 312 to obtain posture information associated with SOS 225. As mentioned above, this posture information may be obtained before the image of SOS 225 is activated on platform 201. In one example, policy feature 314 compares the posture information to the default network administrative polices and determines whether any remediation actions are needed to ensure that SOS 225 can act as a trusted agent for platform 201. This may also further establish the first hierarchical trust layer.

In one example, remediation actions include security logic 310 activating communicate feature 316 to establish and maintain a secure communication channel via an out-of-band communication link with policy decision point 282. In addition, security logic 310, for example, activates cryptographic feature 318 to provide an added level of security for the information exchanged. One example of this added level of security is described below for block 460.

In block 430, in one example, a network access request is initiated from an access requester on platform 201. As mentioned above, in one example, the access requester may be any element on platform 201 to include hardware, software, firmware or a combination of these elements. For example, the access requester is COS 215. The access request, in one example, is made to policy decision point 282.

In block 440, in one example, the access request is facilitated by SOS 225 on platform 201. In one implementation, all network communications from certain platform 201 elements, such as COS 215, pass through SOS 225. In this regard, SOS 225 serves as the policy enforcement point for network administrative policies for these network communications. In one example, SOS 225 activates a policy enforcement agent from among agent(s) 225A to implement policy enforcement activities.

In one implementation, the policy enforcement agent from among agent(s) 225A establishes a secure communication channel over communication link 241 with policy decision point 282. Communication link 241 may include wired, wireless or a combination of wired or wireless pathways. For example, the portion of communication link between SOS 225 and network interface 240 is a wired pathway routed on platform 201 and the portion between network interface 240 and policy decision point 282 is a wireless pathway. In this implementation, the secure communication channel is established and then maintained by the policy enforcement agent in accordance with one or more wireless and/or wired NAC communication protocols included in, for example, NAC protocol stack 262.

In block 450, in one example, the policy enforcement agent from among agent(s) 225A is also establishes a secure communication channel over another communication link. This other communication link, for example, is communication link 221. Although communication link 221 is depicted in FIG. 2 as coupling to driver 222D, the policy enforcement agent, in one example, controls driver 222D that couples to communication link 221. Thus, since communication link 221 couples to driver 222D, the policy enforcement agent couples to communication link 221. Similar to the secure connection between SOS 225 and policy decision point 282, the secure communication channel between manageability engine 150 and the policy enforcement agent is established and then maintained using XML signatures and/or PKI certifications. In one implementation, communicate feature 316 of security logic 310 establishes the secure communication channel with the policy enforcement agent from among agent(s) 225A.

In block 460, in one example, posture feature 312 obtains posture information associated with the access requester, COS 215, and with manageability engine 150. This posture information may be converted to attribute-value pairs (AVPs) or type-length values (TLVs) to facilitate the forwarding of the posture information to the policy enforcement agent.

In one implementation, cryptographic feature 318 in security logic 310 provides an additional level of security. In this implementation, cryptographic feature 318 obtains a secret key (e.g., from memory 330) and cryptographically signs the posture information with that secret key using PKI or another type of encryption scheme. As yet another security measure, cryptographic feature 318 may also include a monatomic transaction ID or nonce to prove liveliness (e.g., time-sensitive) and ensure that an intermediary rogue device cannot capture and replay the posture information. The nonce, for example, may include a time-sensitive, randomly generated number that is appended to the posture information. The cryptographically signed posture information, including the nonce, is then forwarded to the policy enforcement agent. The policy enforcement agent from among agent(s) 225A, in one example, then forwards the cryptographically signed posture information to policy decision point 282.

In block 470, in one example, policy decision point 282 indicates what access COS 215 can have to network 280. For example, policy decision point 282 first evaluates the integrity and authenticity of the posture information and then compares the posture information to network administrative policies to determine what network access to allow.

In one implementation, this indication is cryptographically signed and includes the nonce added by cryptographic feature 318. This indication may be cryptographically signed, for example, so it can only be interpreted by cryptographic feature 318 (e.g., via use of a PKI or other type of encryption scheme). In this regard, once the indication is received from policy decision point 282, the policy enforcement agent forwards the indication to manageability engine 150.

In one example, once manageability engine 150 receives the indication, cryptographic feature 318 verifies the integrity and authenticity of the indication. To determine integrity, this includes a comparison of the nonce included in the indication to the nonce that was included in the posture information that was previously forwarded. To determine authenticity, this includes the use of authentication procedures such as PKI certification or an XML signature. In one implementation, if the indication has integrity and is authenticate, the indication is decoded by cryptographic feature 318 and manageability engine 150 forwards the decoded indication to the policy enforcement agent over the secure communication channel via communication link 221. The policy enforcement agent, for example, then interprets whether the decoded indication forwarded from manageability engine 150 grants the access requested by the access requester, COS 215.

In one example, if cryptographic feature 318 finds that the indication is not authentic (e.g., fails PKI certification or invalid XML signature) or lacks integrity (e.g., the nonce does not match the nonce initially appended and/or lacks liveliness), the cryptographically signed posture information is forwarded again (e.g., following actions taken at block 460) with a new nonce included. Forwarding again with a new nonce, for example, may thwart spoofing attempts by a rogue computing device that is acting as a policy decision point.

In block 480, in one example, network access was granted to COS 215. In this case, the level of network access can be controlled by the policy enforcement agent from among agent (s) 225A through the configuration of filters 242 in network interface 240 or other data traffic filters within platform partitions. Since this indication reflects network administrative policies, the policy enforcement agent, in this example, is enforcing network administrative policies when it interprets the indication and configures the data traffic filters on platform 201 based on that interpretation. Thus, for example, a second hierarchical trust layer is established to access network 280.

In block 490, in one example, network access was not granted. In this case, agent(s) 225A in SOS 225 may determine what actions are required to obtain the desired access. In one implementation, the indication also includes information on how to take those actions. For example, updating anti-virus software or downloading patches from specified internal or external servers that are coupled to network 280 or implementing an access control policy including access control lists (ACLs) that may result in reconfiguring the data traffic filters on platform 201 (e.g., filters 242).

In one example, agent(s) 225A complete the remediation actions described in the indication by policy decision point 282. These remediation actions, for example, include but are not limited to, updating anti-virus software, downloading a patch from a server and downloading or installing given software. Remediation actions may also include configuring data traffic filters 242 on communication link 241 to implement an access control policy to enforce the access control policy. Based on completion of one or more remediation actions, the posture enforcement agent from among agent(s) 225A may request that manageability engine 150 obtain updated posture information that reflects the remediation actions taken. In this case, the process returns to block 460.

In one implementation, a secure communication channel is established between policy decision point 282 and SOS 225, and another secure communication channel is also established between the policy enforcement agent and manageability engine 150. Thus, in this implementation, for subsequent access requests by access requesters on platform 201, the process returns to block 460.

Figure 5:
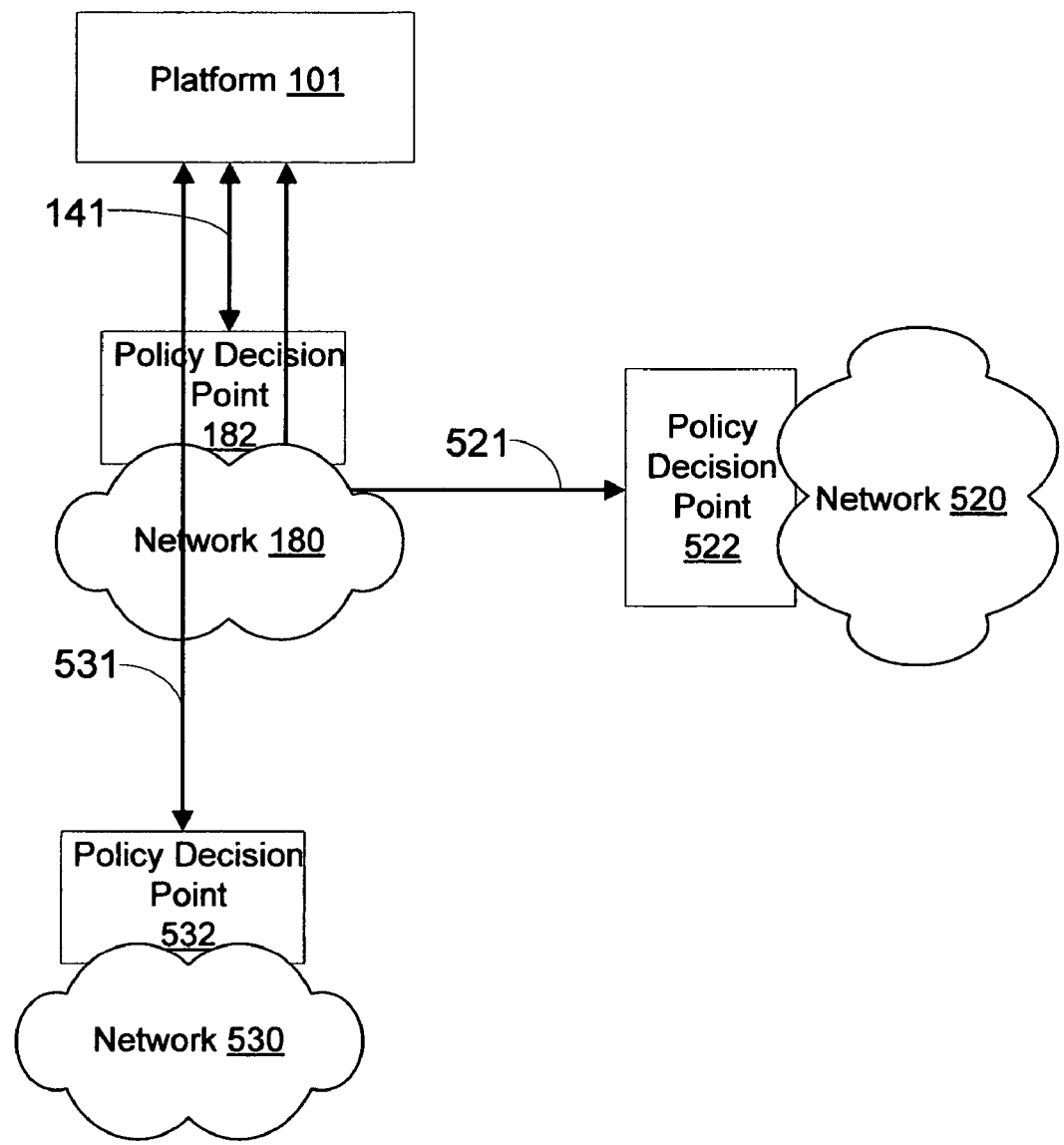
FIG. 5 is an illustration of an example system including a platform obtaining access to multiple networks.

FIG. 5 is an illustration of an example system 500 including platform 101 obtaining access to multiple networks. As shown in FIG. 5, system 500 includes platform 101 coupling to network 180 through policy decision point 182. System 500 also is shown in FIG. 5 as including networks 520 and 530 each having policy decision points 522 and 532, respectively.

In one implementation, platform 101 includes the same elements as described for FIG. 1 and initiates and gains access to network 180 via policy decision point 182 as described for FIG. 1. As part of that access process, platform 101 attempts to establish a secure communication channel over communication link 141. This may include, as mentioned above, the enforcement of default administrative polices by manageability engine 150. One such policy may include a requirement that SOS 125 is authenticated and/or properly activated on platform 101 before any access is allowed. Thus, for example, network access requests made by COS 115 will be blocked by manageability engine 150 if SOS 125 is not authenticated and/or properly activated.

In this implementation, based on SOS 125 being authenticated and properly activated, and the posture information meeting administrative policies for network 180, an access requester on platform 101 is granted access to network 180 by policy decision point 182. The access requester then seeks access to other networks such as networks 520 or 530. Initiating this other access, for example, includes establishing secure communication channels over communication links 521 or 531 to policy decision points 532 or 534, respectively. The access to each network, for example, is obtained as described for FIGS. 1-4.

Figure 6:
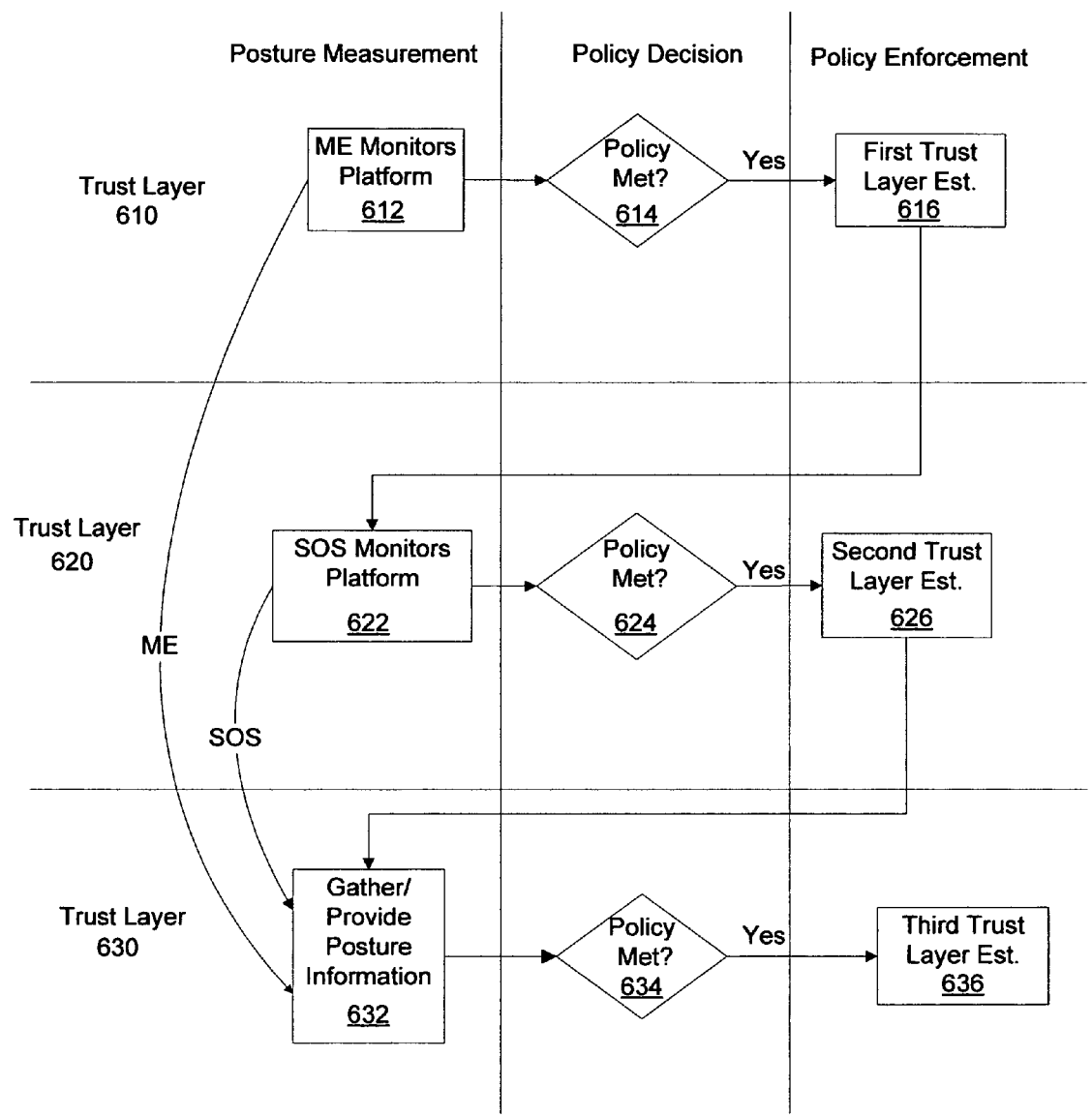
FIG. 6 is a flow chart of an example method to establish multiple layers of hierarchical trust to obtain network access.

FIG. 6 is a flow chart of an example method to establish multiple layers of hierarchical trust to obtain network access. In one example, system 500 depicted in FIG. 5 is used to describe this method. In this method, platform 101 is within a computing device, e.g., a notebook computer. A user of this notebook computer may be a person employed by a corporation with possible access privileges to a corporate network (e.g., a second network—network 530). In this example, the user is traveling and uses the notebook computer to gain access to a hotel LAN (e.g., a first network—network 180) that couples to the Internet. The user, for example is to use that access to the hotel LAN, network 180, to gain access to the corporate network, network 530.

As depicted in the example flow chart in FIG. 6, three layers of hierarchical trust are established before access is obtained to network 530, trust layers 610, 620 and 630. For trust layer 610, for example, block manageability engine 150 enforces a policy (e.g., from among default network administrative policies) that allows access to a network by an access requester is (e.g., COS 115) only if a service operation system (e.g., SOS 125) is up and running and/or properly activated on platform 101. In block 612, for example, manageability engine 150 monitors platform 101 and in block 614 determines whether the policy of SOS 125's activation is met based on the monitoring. For example, in block 616, if the policy is met, a first hierarchical trust layer is established and the access requester gains access to network 180.

For trust layer 620, SOS 125 enforces one or more policies, e.g., from among default network administrative policies. These policies, for example, are based on network 530 requiring that any platform that couples to network 530 through another network enforces these policies prior to seeking access through the other network. For example, SOS 125 enforces these policies by providing protocol filtering (e.g., via filters 142) and/or proxy services to ensure that malicious content is blocked from getting to COS 115 as it seeks access to network 530 through network 180. These policies, for example, may also include but are not limited to an access control list policy, an outbreak containment policy, an intrusion detection policy or other types of monitoring policies that are in addition to proxy monitoring.

At block 622, for example, SOS 125 monitors communications between PDP 182 for network 180 and COS 115. To enforce the polices and to protect COS 115, for example, SOS 125 may monitor data traffic by serving as an HTTP(s) proxy for the network connection between COS 115 and the hotel's network, network 180. SOS 125 may also serve as an HTTP (s) client to policy decision point 182 or other network 180 elements.

At block 624, for example, as a proxy to both COS 115 and network 180 elements, SOS 125 may examine and filter/stop any malicious data traffic destined for COS 115. SOS 125 may also examine and filter/stop data traffic coming from COS 115. Since SOS 125 causes any communications passing to/from COS 115 to pass through the filtering and also acts as a proxy, in one example, the policy of protecting COS 115 is met. Thus at block 626, for example, a second hierarchical trust layer is established and COS 115 may continue to seek access to network 530 through network 180.

For trust layer 630, in one example, access to network 530 may be obtained as described for FIGS. 1-4. At block 632, for example, posture information is gathered and provided to PDP 532 for network 530. As depicted in FIG. 6, this posture information may be provided by manageability engine 150 and/or SOS 125. The information, for example, may be cryptographically signed by manageability engine 150 or cryptographically signed by both manageability engine 150 and SOS 125.

At block 634, for example, PDP 532 compares the posture information to network 530's administrative policies and sends an indication back to manageability engine 150 and/or SOS 125 as to what access is granted. Also as mentioned above for FIGS. 1-4, for example, this indication may include the configuration/reconfiguration of filters or recommended remediation actions. For example, SOS 125 configures filters 142 based on the indication to enforce network 530's administrative policies.

At block 636, for example, a third hierarchical trust layer is established based on SOS 125 or manageability engine 150's configuration of filters 142 that enforces network 530's administrative policies or taking remedial actions that bring COS 115 and/or other platform 101 elements into compliance with the policies. In one example, COS 115 has gained sufficient access to network 530 to establish a VPN connection to a server on network 530 (e.g., shared drives or corporate databases). In one example, once the VPN connection is established, the actions SOS 125 and/or manageability engine 150 took to obtain the first and second hierarchical trust layers are no longer required or are reduced. For example, SOS 125 will no longer act as a is proxy and/or filter communication to/from COS 115 as long as the VPN connection is maintained.

In one example, SOS 125 and/or manageability engine 125 may periodically gather posture information for COS 115 or platform 101 and forward that posture information to policy decision point 532 to maintain the third hierarchical trust level. As a result, policy decision point 532 may receive information regarding the status of COS 115 and restrict access should that status violate network administrative polices. This restricted access, for example, may include a requirement to use manageability engine 150 to authenticate SOS 125 again and/or take remediation actions to regain or reestablish one or more of the hierarchical trust levels.

Referring again to memory 330 in FIG. 3. Memory 330 may include a wide variety of memory media including but not limited to volatile memory, non-volatile memory, flash, programmable variables or states, random access memory (RAM), read-only memory (ROM), flash, or other static or dynamic storage media.

In one example, machine-readable instructions can be provided to memory 330 from a form of machine-accessible medium. A machine-accessible medium may represent any mechanism that provides (i.e., stores and/or transmits) information or content in a form readable by a machine (e.g., an ASIC, special function controller or processor, FPGA, manageability engine or other hardware device). For example, a machine-accessible medium may include: ROM; RAM; magnetic disk storage media; optical storage media; flash memory devices; electrical, optical, acoustical or other form of propagated signals (e.g., carrier waves, infrared signals, digital signals); and the like.

References made in the specification to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in this regard.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

What is claimed is:

1. A method comprising:
    initiating a network access request from an access requester on a platform that couples to a network, the network access request made to a policy decision point for the network;
    establishing a secure communication channel over a communication link between the policy decision point and a policy enforcement point on the platform;
    establishing a secure communication channel over an other communication link, the other communication link between at least the policy enforcement point and a manageability engine resident on the platform, the manageability engine to forward posture information associated with the access requester and the manageability engine, the posture information to be forwarded via the secure communication channel between the manageability engine and the policy enforcement point; and
    forwarding the posture information to the policy decision point via the secure communication channel between the policy enforcement point and the policy decision point, the policy decision point to indicate what access the access requester can obtain to the network based on a comparison of the posture information to one or more network administrative policies.

2. A method according to claim 1, further comprising:
    configuring a data traffic filter on a communication link that couples the platform to the network, the data traffic filter configured by the manageability engine based on a default network administrative policy, configuring the data traffic filter to occur prior to forwarding the posture information to the policy decision point, wherein configuring the data traffic filter establishes a first hierarchical trust layer to access the network.

3. A method according to claim 2, wherein the default network administrative policy includes configuring the data traffic filter to allow only control data traffic to establish a secure communication channel on the communication link.

4. A method according to claim 2 further comprising:
reconfiguring the data traffic filter based at least in part on what access was indicated by the policy decision point, wherein reconfiguring the data traffic filter establishes a second hierarchical trust layer to access the network.

5. A method according to claim 2 further comprising:
receiving the indication of what access the access requester can obtain to the network; and
implementing a remediation action based on the indication not granting the level of network access the access requester is seeking, wherein implementing the remediation action establishes a second hierarchical trust layer to access the network.

6. A method according to claim 5, wherein the remediation action is to include at least one remediation action selected from the following group of: updating anti-virus software, downloading a patch from a server, installing given software and implementing an access control policy by configuring the data traffic filter on the communication link that couples the platform to the network.

7. A method according to claim 1, wherein the access requester comprises a capability operation system and the policy enforcement point is part of a service operation system, the capability operation system and the service operation system to operate on different partitions on the platform, each partition to use platform resources independently.

8. A method according to claim 1, wherein the posture information associated with the access requester is based on integrity measurements of the access requester, the integrity measurements to include at least one integrity measurement selected from the following group of: an anti-virus parameter, a firewall status, a software version, a hardware status, a log file and an existence of given software in a memory on the platform.

9. A method according to claim 1, wherein the one or more network administrative policies include at least one policy selected from the following group of: an access control list policy, an outbreak containment policy, an intrusion detection policy and a monitoring policy.

10. A method according to claim 1, wherein establishing the secure communication channel between the policy decision point and the policy enforcement point includes establishing the secure communication channel using IEEE 802.1X communication protocols.

11. A method according to claim 1, wherein establishing the secure communication channel between the policy enforcement point and the manageability engine includes establishing the secure communication channel using extensible markup language (XML) signatures.

12. A method comprising:
initiating a network access request to a first network from an access requester on a platform that couples to the first network, the network access request made to a policy decision point for the first network, the platform including a plurality of partitions, each partition to use at least a portion of platform resources that are independent of platform resources used by another partition, the plurality of partitions including a partition that supports a capability operating system and including a partition that supports a service operating system, the capability operating system including the access requester, the service operating system including a policy enforcement agent;
determining whether the service operating system is activated on the platform, the determination made by a manageability engine resident on the platform; and
permitting the access requester to seek the requested access to the first network based on the manageability engine's determination, wherein permitting the access requester to seek the requested access establishes a first layer of hierarchical trust to access a second network.

13. A method according to claim 12 further comprising:
obtaining the access indicated for the access requester to the first network; seeking access to the second network through the first network, the access sought by the access requester, monitoring data traffic between the capability operating system and the first network, the data traffic monitored by the service operating system;
determining whether the data traffic meets one or more default network administrative policies for the second network, the determination made by the service operating system; and
permitting the access requester to initiate the requested access to the second network based on the system operating system's determination, wherein permitting the access requester to initiate the requested access to the second network establishes a second hierarchical trust layer to access the second network.

14. A method according to claim 13, wherein the one or more default network administrative policies include at least one policy selected from the following group of: an access control list policy, an outbreak containment policy, an intrusion detection policy and a monitoring policy.

15. A method according to claim 13, further comprising:
the access requester initiating the other network access request to the second network through the first network, the other network access request made to a policy decision point for the second network;
establishing a secure communication channel over a communication link between the policy decision point for the second network and the service operating system;
establishing a secure communication channel over another communication link, the other communication link between the service operating system and the manageability engine, the manageability engine to forward posture information associated with the access requester and the manageability engine, the posture information to be forwarded via the secure communication channel between the manageability engine and the service operating system;
forwarding the posture information to the policy decision point for the second network via the secure communication channel between the service operating system and the policy decision point for the second network, the policy decision point for the second network to indicate what access the access requester can obtain to the second network based on a comparison of the posture information to one or more network administrative policies; and
receiving the indication of what access the access requester can obtain to the second network, the system operating system's policy enforcement agent to enforce the level of access based on the indication, wherein enforcing the level of access establishes a third hierarchical trust layer to access the second network.

16. A method according to claim 15, further comprising:
obtaining the access indicated for the access requester to the second network; gathering posture information associated with the capability operating system, the posture information associated with the capability operating system gathered by the service operating system;

forwarding the gathered posture information to the policy decision point for the second network, wherein the policy decision point for the second network indicates what access the access requester can maintain to the second network based on a comparison of the gathered posture information to the one or more network administrative policies; and receiving the indication of what access the access requester can maintain to the second network, the system operating system's policy enforcement agent to enforce the level of access based on the indication, wherein enforcing the level of access maintains the third hierarchical trust layer to access the second network.

17. An apparatus resident on a platform to couple to a network, the apparatus comprising:
    a manageability engine that includes memory and logic, the logic to:
        establish a secure communication channel via a communication link on the platform, the secure communication channel establish with a policy enforcement agent on the platform;
        obtain posture information associated with the manageability engine and an access requester on the platform, the access requester to seek access to the network;
        cryptographically sign the posture information with a secret key maintained in the memory; and
        forward the cryptographically signed posture information to the policy enforcement agent via the secure communication channel, the cryptographically signed posture information to be forwarded to a policy decision point for the network via another secure communication channel established between the policy enforcement agent and the policy decision point, wherein the policy decision point is to indicate what access the access requester can obtain to the network based on a comparison of the posture information to a network administrative policy.

18. An apparatus according to claim 17, the logic to further comprise logic to:
    configure a data traffic filter on a communication link that couples the platform to the network, the data traffic filter configured by the logic based on a default network administrative policy that allows only control data traffic to pass through the data traffic filter, the control data traffic to include authentication information, wherein to establish a first hierarchical trust layer to access the network, the logic is to configure the data traffic filter prior to forwarding the cryptographically signed posture information to the policy decision point.

19. An apparatus according to claim 18, the indication of what access the access requester can obtain to the network is cryptographically signed by the policy decision point, the cryptographically signed indication to be decoded by the manageability engine's logic to determine what access the access requester can obtain to the network, wherein to establish a second hierarchical trust level to access the network, the policy enforcement agent on the platform is to enforce the level of access determined to be obtainable.

20. An apparatus according to claim 19, wherein the posture information and the indication are cryptographically signed using a public key infrastructure (PKI) encryption scheme.

21. An apparatus according to claim 17, the logic to cryptographically sign the posture information comprises the logic to include a nonce with the posture information, the nonce to include a time-sensitive, randomly generated number, the logic to cryptographically sign both the posture information and the nonce, wherein the indication of what access the access requester can obtain to the network is cryptographically signed by the policy decision point, the cryptographically signed indication to also include the nonce, the cryptographically signed indication to be decoded by the manageability engine's logic, the logic to authenticate that the indication is associated with the cryptographically signed posture information based on the nonce included with the indication matching the nonce included with the posture information.

22. An apparatus according to claim 17, wherein the posture information associated with the access requester and the manageability engine is based on integrity measurements of the access requester and the manageability engine, the integrity measurements to include at least one integrity measurement selected from the following group of: an anti-virus parameter, a firewall status, a software version, a hardware status, a log file and an existence of given software in a memory on the platform.

23. An apparatus according to claim 17, wherein the secure communication channel established with the policy enforcement point is established using extensible markup language (XML) signatures.

24. A platform to couple to a network comprising:
    platform resources to include memory and one or more processing elements;
    a plurality of partitions, each partition to use at least a portion of platform resources that are independent of platform resources used by another partition, the plurality of partitions to include a partition that supports a capability operating system and a partition that supports a service operating system, the capability operation system to request access to the network, the service operating system to include a policy enforcement agent to enforce one or more network administrative policies; and
    a manageability engine that includes logic and memory that is exclusively accessible to the logic, the logic to:
        obtain posture information associated with the capability operating system;
        cryptographically sign the posture information with a secret key maintained in the memory that is exclusively accessible to the logic;
        forward the cryptographically signed posture information to a policy decision point for the network, wherein the policy decision point is to indicate what access the capability operating system can obtain to the network based on a comparison of the posture information to network administrative policies.

25. A platform according to claim 24, the manageability engine's logic to further comprise logic to:
    configure a data traffic filter on a communication link that couples the platform to the network, the data traffic filter configured by the logic based on a default network administrative policy that allows only control data traffic to pass through the data traffic filter, the control data traffic to include authentication information, wherein to establish a first hierarchical trust layer to access the network, the logic is to configure the data traffic filter prior to forwarding the cryptographically signed posture information to the policy decision point.

26. A platform according to claim 25, the decoded indication to be used by the service operating system's policy enforcement agent to enforce the one or more network administrative policies and determine what access the capability operating system can obtain to the network, the service operating system to implement a remediation action based on the capability operating system not obtaining a desired level of access to the network, wherein to establish a second hierarchical trust layer to access the network includes the enforcement of one or more network administrative policies and the implementation of the remediation action.

27. A platform according to claim 26, wherein the remediation action is to include at least one remediation action selected from the following group of: updating anti-virus software used by the capability operating system, downloading a patch for the capability operating system from a server, installing given software and implementing an access control policy by configuring a data traffic filter on a communication link that couples the platform to the network.

28. A platform according to claim 24, wherein the posture information and the indication are cryptographically signed using a public key infrastructure (PKI) encryption scheme.

29. A platform according to claim 24, wherein the posture information associated with the capability operating system and the manageability engine is based on integrity measurements of the capability operating system, the integrity measurements to include at least one integrity measurement selected from the following group of: an anti-virus parameter, a firewall status, a software version, a hardware status, a log file and an existence of given software in a memory on the platform.

30. A platform according to claim 24, wherein the manageability engine's memory and logic are physically separate from the platform resources used by the plurality of partitions.

31. A platform according to claim 24, the memory that is exclusively accessible to the manageability engine's logic includes default network administrative polices, the default network administrative polices to include a policy to restrict access to the capability operating system if the service operating system is not active, the manageability engine's logic to enforce the policy, wherein to enforce the policy establishes a first hierarchical trust layer to access the network.

32. A platform according to claim 31, the service operating system is to establish a secure communication link with the policy decision point, the service operating system to gather and forward posture information associated with the capability operating system, the policy decision point to indicate what network access the capability operating system can obtain to the network based on a comparison of the posture information gathered by the service operating system, the service operating system's policy enforcement agent to enforce the level of access based on the indication from the policy decision point, wherein enforcing the level of access is to maintain the second hierarchical trust level to access the network.

33. A platform according to claim 24, wherein the platform is to operate according to a virtualization technology scheme.

34. A machine-accessible medium comprising content, which, when executed by a machine resident on a platform to couple to a network causes the machine to:
   establish a secure communication channel via a communication link on the platform, the secure communication channel establish with a policy enforcement agent on the platform;
   obtain posture information associated with the machine and an access requester on the platform, the access requester to seek access to the network;
   cryptographically sign the posture information with a secret key maintained in a memory of the machine; and
   forward the cryptographically signed posture information to the policy enforcement agent via the secure communication channel, the cryptographically signed posture information to be forwarded to a policy decision point for the network via another secure communication channel established between the policy enforcement agent and the policy decision point, wherein the policy decision point is to indicate what access the access requester can obtain to the network based on a comparison of the posture information to network administrative policies.

35. A machine-accessible medium according to claim 34, wherein the posture information associated with the access requester and the machine is based on integrity measurements of the access requester and the machine, the integrity measurements to include at least one integrity measurement selected from the following group of: an anti-virus parameter, a firewall status, a software version, a hardware status, a log file and an existence of given software in a memory on the platform.

36. A machine-accessible medium according to claim 34, wherein the secure communication channel established with the policy enforcement point is using established extensible markup language (XML) signatures.

* * * * *